United States Patent [19]
Dematteo et al.

[11] 3,803,916
[45] Apr. 16, 1974

[54] DIRECT MEASUREMENT OF EARTH'S VERTICAL DEFLECTION USING SHIP'S INERTIAL NAVIGATION SYSTEM

[75] Inventors: John J. Dematteo, Whitestone; Robert A. Leonards, Brooklyn, both of N.Y.; Anthony W. Butera, Sykesville, Md.

[73] Assignee: The United States of America as represented by the Secretary of the Navy, Washington, D.C.

[22] Filed: Feb. 9, 1973

[21] Appl. No.: 330,895

[52] U.S. Cl. ................................ 73/382
[51] Int. Cl. ............................... G01v 7/16
[58] Field of Search ..................... 73/382

[56] References Cited
UNITED STATES PATENTS
3,633,003  1/1972  Talwani .................... 73/382 X Primary Examiner—James J. Gill
Attorney, Agent, or Firm—Richard S. Sciascia; Arthur A. McGill; Prithvi C. Lall

[57] ABSTRACT

A method for obtaining at a point the value of earth's vertical deflection, which is the angular difference between the local or astronomic vertical at a point and the normal to the reference ellipsoid of the earth at that point. The position coordinates of the point is measured by using a ship's inertial navigation system (SINS) which is compared with corresponding the position coordinates of the same point measured by using a geodetic reference apparatus, such as a long-range electronic navigation system (LORAN) or high precision short-range navigation (HIRAN). The difference between the two values of the position coordinates of the point; also called $dP_T$ total position error; is due to vertical deflection; i.e., the difference between local vertical and geodetic vertical or normal to the reference ellipsoid of the earth at that point; error due to gyro drift of the SINS; and reference velocity error. Contributions due to error because of gyro drift and to error in reference velocity are subtracted from $dP_T$, the value of the difference between the two values of position coordinates of the point, using SINS RESET technique and a standard reference velocity technique respectively so as to obtain $dP_V$, position error due to earth's vertical deflection. The value of $dP_V$ is then mainly due to earth's vertical deflection at that point, from which the value of vertical deflection at that point is obtained using SINS INVERSE FILTER technique.

2 Claims, 2 Drawing Figures

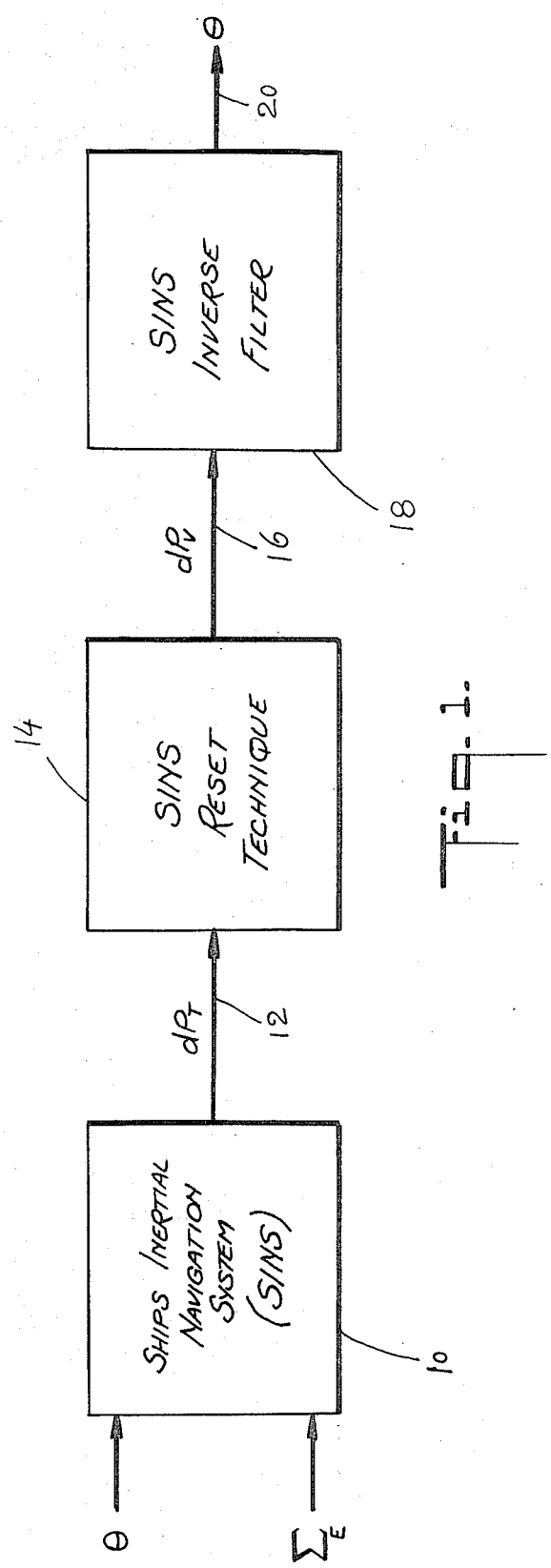

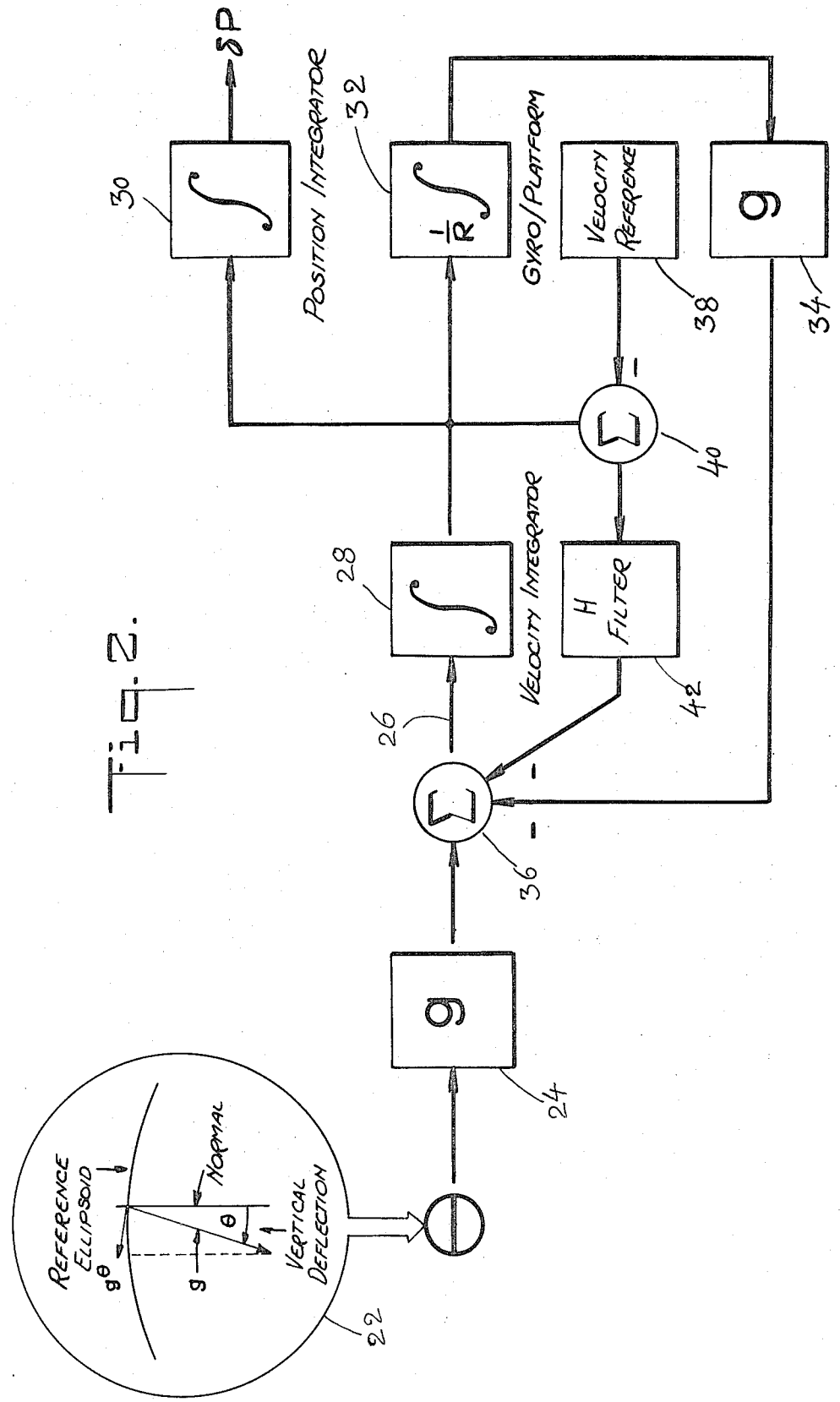

DIRECT MEASUREMENT OF EARTH'S VERTICAL DEFLECTION USING SHIP'S INERTIAL NAVIGATION SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to a method of determining earth's vertical deflection and more particularly to a direct measurement of earth's vertical deflection at a point using a ship's inertial navigation system, hereinafter called SINS and a continuous geodetic reference apparatus such as a LORAN.

The classical and indirect method presently used for computing earth's vertical deflection at various points in a particular area of an ocean requires that survey data be taken over the area with a gravimeter and such data be processed using the Vening Meinesz surface integral. This classical method involves making closely spaced measurements of gravity anomalies with a gravimeter over the entire area. These gravity anomalies, combined with other available measurements made over the remaining parts of the earth's surface, are integrated in the Vening Meinesz equation to yield a calculation of the earth's vertical deflection at a desired point. However, this classical and indirect method of obtaining earth's vertical deflection is time-consuming and costly. It is, therefore, most desirable to find an efficient means of measuring earth's vertical deflection directly.

SUMMARY OF THE INVENTION

The direct method of measuring earth's vertical deflection at a point using a SINS and a continuous geodetic reference apparatus such as a LORAN according to the teachings of the present invention is determining the position coordinates of the point using a SINS, which are related to local vertical or astronomic vertical at the point. Geodetic position coordinates of the same point are obtained by using a continuous reference apparatus, such as a LORAN. The geodetic position coordinates of the point are related to the geodetic vertical or normal to the reference ellipsoid of the earth at that point. The difference, $dP_T$, between the two values of the position coordinates, one obtained by using a SINS and the other obtained by using a LORAN, is due to earth's vertical deflection at that point, error due to gyro drift of SINS, and error due to reference velocity of the ship carrying the SINS. Contribution to the difference between the two values of the position coordinates due to error because of gyro drift and error in reference velocity are subtracted from the difference, $dP_T$, in the two values of the position coordinates at that point. The resultant difference, $dP_V$, is only due to earth's vertical deflection at that point. The value of earth's vertical deflection at that point is then obtained from the resultant difference by using SINS INVERSE FILTER technique.

One object of this invention is to make a direct measurement of earth's vertical deflection at a point.

Another object of this invention is to obtain a quick and accurate determination of earth's vertical deflection at a point.

Still another object of this invention is to make a direction measurement of earth's vertical deflection which is less time-consuming but is compatible with classical indirect measurements of earth's vertical deflection at that point.

Other objects, advantages and novel features of the invention will become apparent from the following detailed description of the invention when considered in conjunction with the accompanying drawings wherein:

BRIEF DESCRIPTION OF THE DRAWINGS

FIG. 1 is a block diagram of the method illustrating a direct measurement of earth's vertical deflection;

FIG. 2 is a diagrammatic representation of a mathematical model involving some of the concepts using the direct measurement of earth's vertical deflection according to this invention.

DESCRIPTION OF A PREFERRED EMBODIMENT

Referring to the drawings wherein like reference characters designate like parts throughout and more particularly to FIG. 1 thereof, a block diagram of the method used in determining earth's vertical deflection at a point is shown. A ship's inertial navigation system (SINS) is used to obtain the position coordinates of the point which are related to local or astronomic vertical of the point. The difference, $dP_T$, between the local position coordinates obtained by using a SINS and the geodetic position coordinates of the point obtained using a geodetic reference apparatus such as a LORAN is compared in block 10 so as to get $dP_T$ as the output of block 10. $dP_T$ is taken as an input represented by arrow 12 for SINS RESET technique shown diagrammatically by block 14. As indicated in FIG. 1 $dP_T$, which represents the difference in values of position coordinates obtained by using SINS and a LORAN is shown to be due to vertical deflection, $\theta$, and $\Sigma_E$, the contribution due to the SINS gyro drift and error in velocity reference of the SINS. Contribution due to error in velocity reference of the SINS is obtained by determining the velocity of the ship housing the SINS by EM Log method. The value of ships velocity at the point is also obtained by determining the values of a geodetic position coordinate of the ship as a function of time. The difference between the two velocities gives an error in reference velocity from which is extrapolated the error contribution to $dP_T$ by using a standard method. The contribution to $dP_T$ caused by gyro drift of the SINS is obtained by using a standard SINS RESET technique. After subtracting contributions due to gyro drift of the SINS and error in reference velocity from the SINS from $dP_T$, $dP_V$, the error in position coordinate of the point due to the earth's deflection at the point, is obtained. The value of earth's vertical deflection $\theta$ is then obtained from the value of $dP_V$ which is used as an input, shown by arrow 16, by using SINS INVERSE FILTER technique which involves the equations of dynamics of the SINS and is shown by block 18. The output of block 18 is represented by arrow 20 which is earth's vertical deflection at the point.

A diagrammatic representation of the mathematical model is shown in FIG. 2. As a ship enters an area of vertical deflection where the direction of acceleration vector due to gravitational field changes, SINS accelerometers sense a horizontal component of this vector, which is equal to $g\theta$ for small values of $\theta$ expressed in radians. The response of the SINS is such that the acceleration component $g\theta$ which appears as an error due to vertical deflection is integrated to give a velocity error, which in turn causes a platform tilt. Circle 22 shows the difference between local or astronomic vertical and normal to the reference ellipsoid of the earth. Vertical deflection $\theta$, acting on acceleration vector $g$ represented by block 24, gives rise to horizontal component of acceleration, i.e., $g\sin\theta$ which is equal to $g\theta$ for small values of vertical deflection $\theta$ expressed in radians. When $g\theta$ is used as an input represented by arrow 26 to a velocity integrator 28, the output of the velocity interval appears as velocity error due to vertical deflection. When the output of velocity integrator is integrated again by a position integrator 30, it gives a position error represented by $\delta P$ due to vertical deflection. When this position error is scaled properly, as shown in block 32, it gives the value of platform tilt. This platform tilt, when operated upon vector g represented by block 34 and summed at summer 36 which couples the platform tilt through vertical component of g factor to the accelerometers and thus closes the so called Schuler loop. As a result of this, the platform would oscillate about the g vector with a natural period of 84 minutes which corresponds to the Schuler loop frequency of the system. The output of the velocity integrator 28 and velocity reference as measured by EM Log method and represented by block 38, are summed at summer 40 which is operated upon a filter H designated by numeral 42 which is used to dampen the oscillations of the platform and thus obtain a steady state value of $\theta$. Hence, the SINS platform acts like a plumb line in seeking the local or so called astronomic vertical.

Thus the representation of FIG. 2 shows how the platform of the SINS reacts to the earth's vertical deflection at a particular point. However, errors caused by gyro drift of the SINS and error caused by difference in reference velocity from the velocity determined by using geodetic coordinates also contribute to the position error in addition to the position error $dP_V$ caused by $\theta$, earth's vertical deflection at that point. Thus, the total error in position coordinates, $dP_T$, as obtained by the difference in position coordinates determined by using the SINS and position coordinates determined by geodetic reference apparatus such as LORAN comprises $dP_V$, i.e., error due to vertical deflection only; and errors due to gyro drift of the SINS and reference velocity from the SINS. Contribution to the position errors due to gyro drift is calculated by using SINS RESET technique which is a well known method in the field of navigation. Contribution due to error in reference velocity can also be calculated once the speed of the ship in water carrying the SINS, determined by EM Log method, and the velocity obtained by using geodetic position coordinates of the ship as a function of time. The contribution due to error in reference velocity is much smaller than the contribution due to gyro drift of the SINS. Once the contributions resulting from the gyro drift of the SINS and error in reference velocity of the SINS are subtracted from $dP_T$, the total position error, one obtains $dP_V$, position error mainly due to vertical deflection. The actual behavior of the platform tilt and position error as a moving SINS is exposed to a varying vertical deflection dependent on the amplitude and frequency characteristics of both the forcing functions $g\theta$ and the SINS Schuler loop dynamics G. The difference $dP_V$ between SINS indicated position and some geodetic reference system such as a LORAN will yield a measurement of the vertical deflection once the SINS Schuler loop dynamics are taken into account. Mathematically this means that $dP_V(S) = G(S)\theta(S)$. Consequently, $\theta(S)$ can be obtained from $[1/G(S) \, dP_V(S)]$ where $1/G(S)$ represents the inverse Laplace transfer function of the SINS.

Thus the method of direct measurement of earth's vertical deflection according to the teachings of this invention comprises determination of the difference in astronomic or local vertical as determined by a SINS and a geodetic vertical as determined by a geodetic reference coordinate. This is accomplished by determining the difference in position coordinates of a point as determined by the SINS as well as a geodetic reference apparatus such as LORAN. This difference in position coordinates as determined by a SINS and a LORAN is corrected for errors introduced in the position coordinates due to error in reference velocity and gyro drift of the SINS. Once the contribution due to error in reference velocity and gyro drift is accounted for the remaining error in position coordinates is mainly due to earth's vertical deflection. By using SINS INVERSE FILTER technique involving dynamics of the Schuler loop and inverse Laplace transfer function of SINS $\theta$, earth's vertical deflection at that point is obtained.

Obviously many modifications and variations of the present invention are possible in the light of above teachings. It is therefore understood that within the scope of the appended claims the invention may be practiced otherwise than as specifically described.

We claim:

1. A method of measuring earth's vertical deflection directly at a point on the earth's surface comprising the steps of:

determining local position coordinates at such point using a SINS;

determining corresponding geodetic position coordinates at such point using a geodetic reference apparatus and thus finding the difference between said local position coordinates and said geodetic position coordinates at such point;

determining the contribution to the difference between said local position coordinates and said geodetic position coordinates due to gyro drift of said SINS using SINS RESET technique;

determining the contribution to the difference between said local position coordinates and said geodetic position coordinates due to error in reference velocity of said SINS;

determining the contribution to the difference between said local position coordinates and said geodetic position coordinates due to earth's vertical deflection at such point by subtracting from the difference between said local position coordinates and said geodetic position coordinates the contributions due to gyro drift and error in velocity reference of said SINS; and determining earth's vertical deflection at such point from the value of the contribution in said local position coordinates and said geodetic position coordinates at such point only due to earth's vertical deflection at such point by using SINS INVERSE FILTER technique.

2. The method of claim 1 wherein the step of determining the contribution to the difference between said local position coordinates and said geodetic position coordinates due to error in reference velocity of said SINS further comprises determining the reference velocity of said SINS using an EM Log method;

determining the geodetic reference velocity of said SINS using said geodetic reference apparatus and finding the difference between the two values of reference velocity of said SINS; and determining the contribution to the difference between said local position coordinates and said geodetic position coordinates due to error in the reference velocity of said SINS.

* * * * *